(12) United States Patent
Houston et al.

(10) Patent No.: US 10,351,081 B1
(45) Date of Patent: Jul. 16, 2019

(54) WIRE-HARNESS VESSEL

(71) Applicant: Valeo North America, Inc., Troy, MI (US)

(72) Inventors: James Houston, Seymour, IN (US); Sanders Brott, Seymour, IN (US); Ziyi Li, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 12 days.

(21) Appl. No.: 16/018,126

(22) Filed: Jun. 26, 2018

(51) Int. Cl.
| *B60R 16/02* | (2006.01) |
| *H02G 3/06* | (2006.01) |
| *H02G 3/04* | (2006.01) |
| *H02G 3/34* | (2006.01) |

(52) U.S. Cl.
CPC ....... *B60R 16/0215* (2013.01); *H02G 3/0481* (2013.01); *H02G 3/06* (2013.01); *H02G 3/34* (2013.01)

(58) Field of Classification Search
CPC ........ B60R 16/0215; H02G 3/34; H02G 3/06; H02G 3/0481
USPC ...................................................... 174/70 R
See application file for complete search history.

(56) References Cited

U.S. PATENT DOCUMENTS

| 4,882,842 A | 11/1989 | Basson et al. | |
| 5,394,502 A * | 2/1995 | Caron ................ | G02B 6/4473 174/72 A |
| 6,364,394 B1 | 4/2002 | Davis, Jr. et al. | |
| 6,642,454 B2 | 11/2003 | Mercier et al. | |
| 2002/0129961 A1 | 9/2002 | Baker | |
| 2005/0076478 A1 * | 4/2005 | Miyazaki ........... | B65D 63/1063 24/16 PB |
| 2008/0296037 A1 * | 12/2008 | Burland ............... | H02G 3/0487 174/36 |
| 2009/0242711 A1 | 10/2009 | Yang | |
| 2013/0256028 A1 * | 10/2013 | Oiwa .................. | B60R 16/0215 174/72 A |
| 2015/0329069 A1 * | 11/2015 | Daugherty .......... | B60R 16/0207 174/72 A |

* cited by examiner

*Primary Examiner* — Sherman Ng
(74) *Attorney, Agent, or Firm* — Oblon, McClelland, Maier & Neustadt, L.L.P.

(57) ABSTRACT

A wire-harness device that can be preconfigured for a predetermined automotive subassembly, including one or more plastic sheets wrapped around the plurality of insulated wires between discrete portions forming one or more branches to allow bending at the discrete portions and maintain stiffness between the discrete portions. A three-dimensional arrangement of the wrapped wires can be formed by bending at the discrete portions. The three-dimensional arrangement forms a predefined shape for positioning against walls of a housing of the subassembly in an orientation for connection at predetermined locations of the subassembly. A pair of straps are wrapped around the plastic sheet at each end for holding the plastic sheet in place. Each stiff wrapped sheet provides rigidity and containment to protect wires from abrasion and pinching, while simplifying installation into automotive subassemblies.

18 Claims, 10 Drawing Sheets

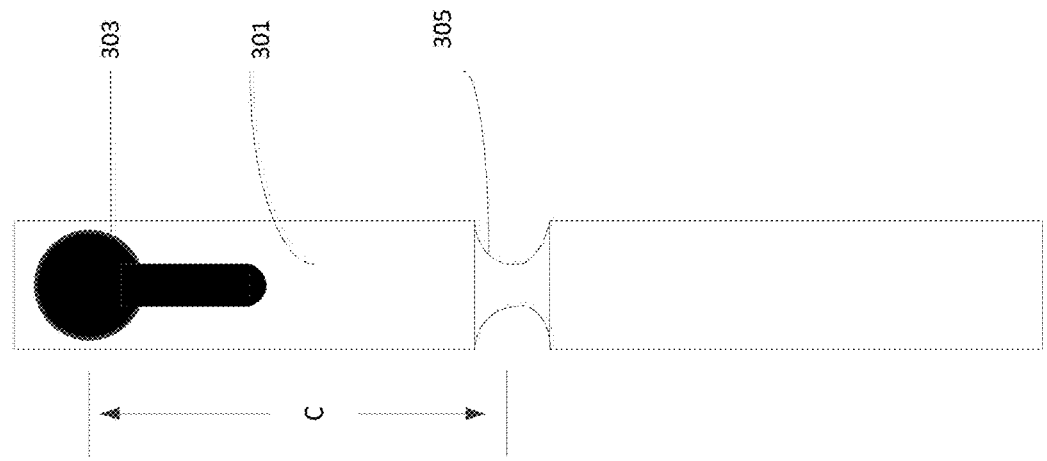

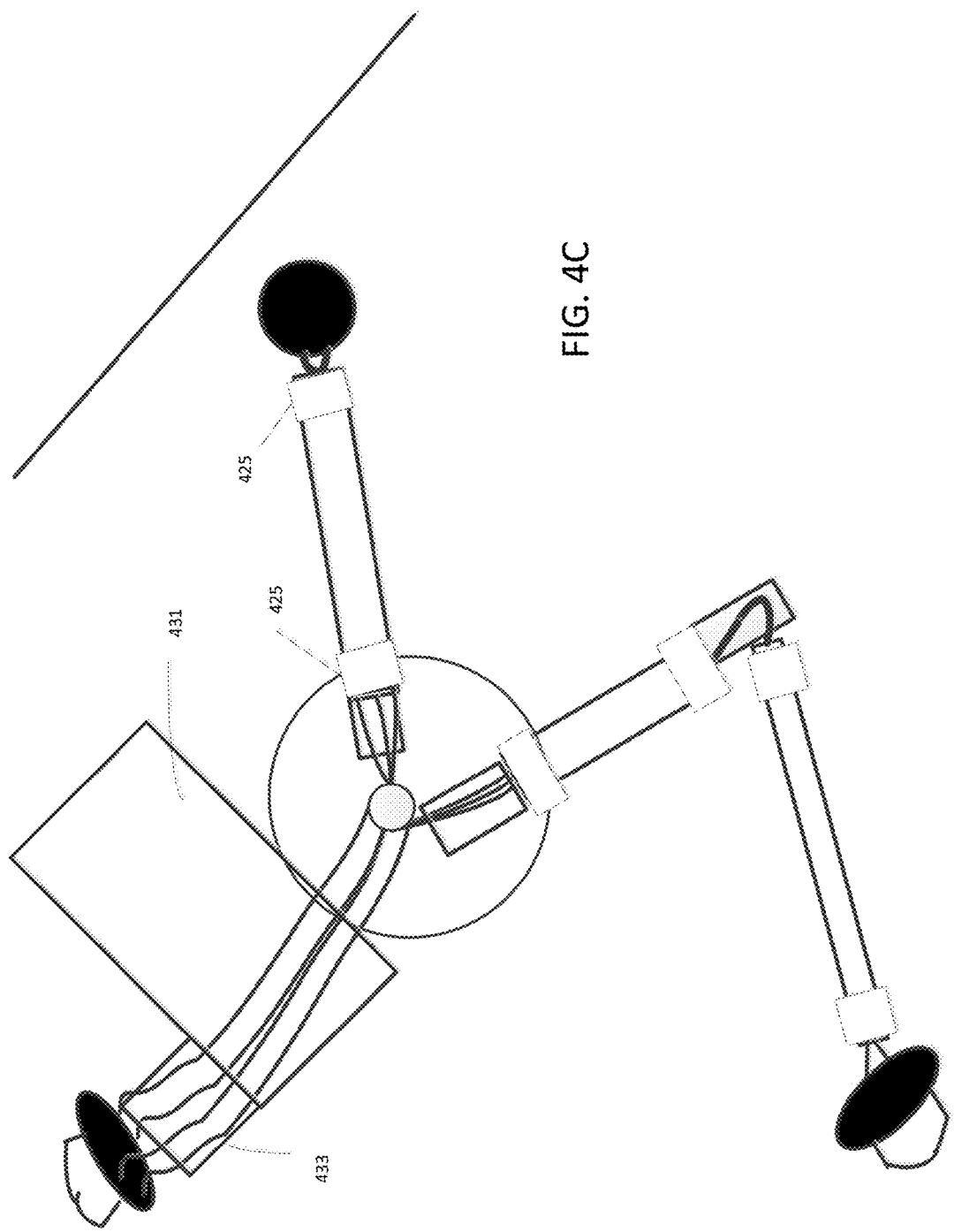

WIRE-HARNESS VESSEL

BACKGROUND

Field of Disclosure

The present disclosure relates generally to three-dimensional wire-harness structure, for example, a predetermined wire-harness device in an automotive subassembly.

Description of the Related Art

Automobile vehicles contain various types of lighting devices. Exterior automotive lighting devices may include a stop light, tail light, head lamp, daytime running light, fog light, turn signal lights, and other signaling lights. Interior automotive lighting devices may include cabin lighting, instrument panel lighting, port lighting (data, power), interface lighting (cup holders, glove boxes), and ingress and egress lighting (puddle lights). Automotive lighting devices, such as a head lamp or rear lighting array, are typically a subassembly of the automobile vehicle.

Automobile vehicles contain various electronic devices that are connected by wiring. Automotive electronic devices may include power outlets and cigarette lighters. Automotive electronic devices may be applied inside a subassembly or inside a hidden access within an automobile, such as above the head liner, behind door skins, in the dash or center console, or in the engine compartment or trunk. Automotive lighting devices or automotive electronic devices are generally connected to a power source, or to a source of data and instructions, by way of a wire-harness. A wire-harness may be arranged as a wire-harness assembly that typically includes several insulated wires that originate at a main connector and follow a side-wall of a subassembly which may involve bending at certain positions. In some cases, a wire-harness assembly may have several branches which end in connectors to provide power or communicate to various lighting devices or automotive electronic devices. The structure of the wire-harness assembly in the subassembly including bent portions and branches forms a three-dimensional structure.

Wire-harness assemblies are typically preassembled in batches for later installation into an automotive subassembly. Preassembly of a wire-harness assembly is typically performed by hand on build boards. Wire-harness assemblies may be a few inches or greater in length. Once assembled, several wire-harnesses may be placed in a container.

The preassembled wire-harness assemblies are installed in automotive subassemblies. The wire-harness assemblies may be installed by first retrieving a wire-harness assembly from the container of wire-harness assemblies. The wire-harnesses in the box may be tangled.

Also, the wire-harness assemblies are generally flimsy. Subsequently, a wire-harness assembly typically has to be untangled in order to separate it from other wire-harness assemblies in the box. Once untangled, it may not be evident how the flimsy wire-harness assembly would have to be arranged and connected in an automotive subassembly. Care must be taken to bend and arrange branches of a wire-harness so that the wire-harness is properly installed and each branch is attached to the correct connection in the subassembly.

Upon manipulation of the wire-harness assembly in order to arrange bent portions and branches for installation to the interior of an automotive subassembly, the wire-harness assembly may encounter pinch points, which are areas where the wire is not intended to be because of the risk of damaged by compression, tension, or abrasion, for example, by securing two pieces with a screw and compressing the wire.

Also, because wire-harness assemblies are generally long and flexible and some wire insulation comes into contact with assembly walls, the assemblies may suffer from abrasion due to sporadic rubbing along an edge of the subassembly. Insulation on one or more wires in a bundle may wear thin, leading to an electrical shortage, and malfunction of electrical components.

FIGS. 7A and 7B illustrate conventional wire bundle retainers. The wire bundle retainer of FIG. 7A may include a rigid support 714 and a wire bundle 722. Tape 740 retains the wire bundle 722 on the rigid support 714. The rigid support 714 may take on various shapes that are needed to direct and support the wire bundle 722 along different axes. FIG. 7B shows a wire retainer that does not include a rigid support. Instead, tape 753 is wrapped around a wire bundle 751. Tape 753 may be wrapped around entire portions of the wire bundle 751. Typically, the tape 753 is wrapped around the bundle 751 by hand.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 3 is a view of a tie strap according to an exemplary aspect of the disclosure;

FIGS. 4A, 4B, 4C and 4D are views of a wire-harness as it is being wrapped according to an exemplary aspect of the disclosure;

DETAILED DESCRIPTION

Figure 1:
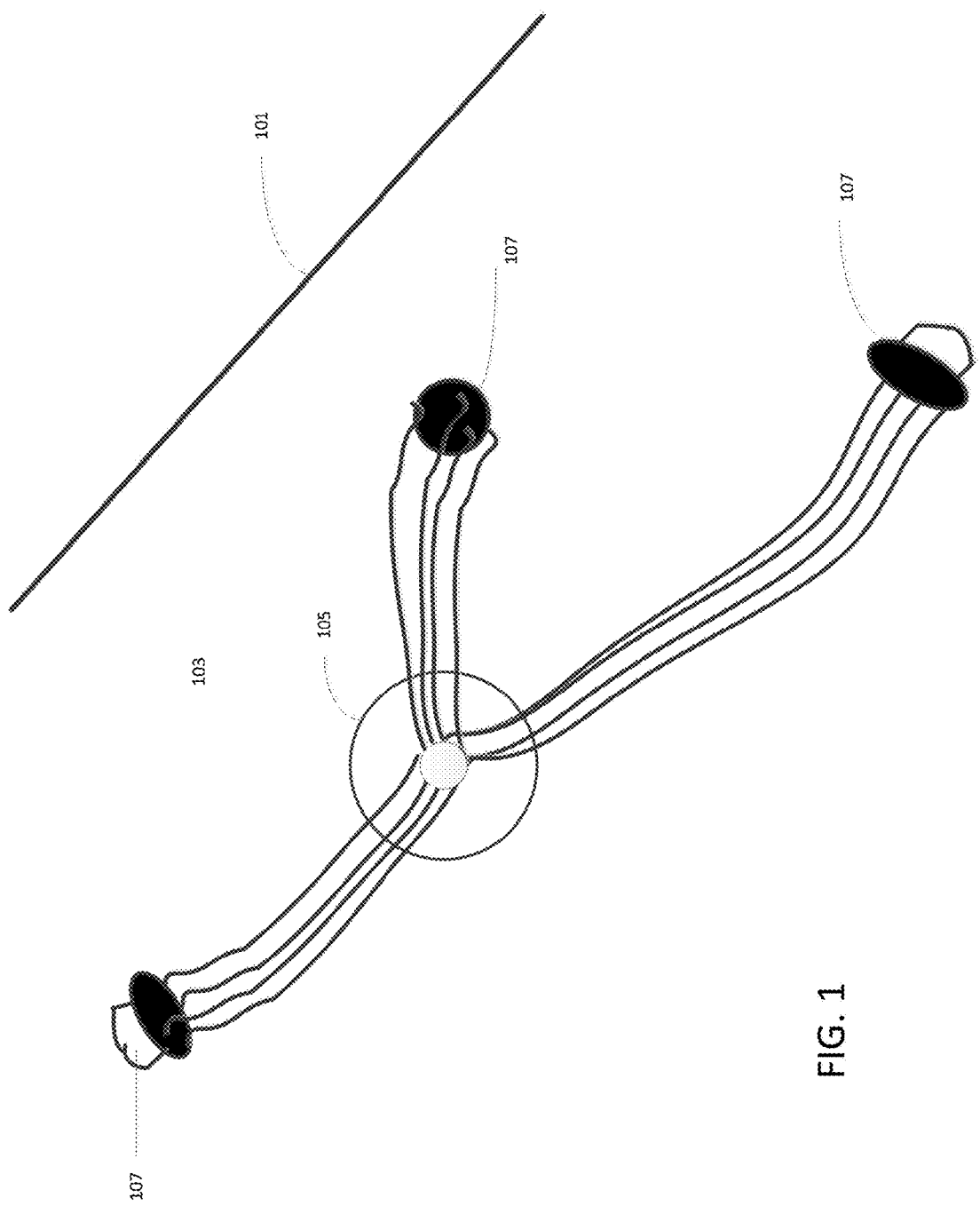
FIG. 1 is a view of a wire-harness before it is wrapped according to an exemplary aspect of the disclosure.

Referring now to the drawings, wherein like reference numerals designate identical or corresponding parts throughout several views, the following description relates to wire-harness vessel, and in particular a three-dimensional structure that prevents the wire-harness from being pinched or abraded and lead to failures and that can reduce time and effort for installation into automotive lamps or other automotive assemblies.

Wire-harnesses for installation into automotive lamps may be pinched or become abraded and lead to electrical failures. Pinching may occur when a wire-harness is secured to a wall by a screw or other fastener. Over pinching of one or more insulated wires can lead to a short and a blown fuse. Abrasion of one or more insulated wires of a wire-harness can occur over time as a result of sporadic rubbing due to vibration. A certain number of rubbing strokes can cause the wire insulation to wear to a point where some bare wire may be exposed. Worn wire insulation can lead to failure of the wire insulation and may cause a short in a circuit. Pinching on one or more wires in a wire-harness and abrasion in one or more wires in a wire-harness can lead to a need to replace the failed wire-harness. Failed wire-harnesses are typically replaced by hand and require care in installation. A replacement wire-harness may be removed from a container of similar wire-harnesses that may be entangled with each other. Once retrieved from a container, bending portions and branches of the wire-harness must be identified and care must be taken to ensure that the bending portions are at correct positions and that the branches match corresponding connection positions in a subassembly destination. Proper orientation of wire-harness branches may not be evident and may involve trial and error to determine an appropriate arrangement. A conventional installation approach is to wrap branches of a wire-harness with a tape, which is typically wrapped by hand at the time of installation into a subassembly.

A solution is to construct a wire-harness for a three-dimensional structure in advance using one or more vessels made of thin plastic sheet(s). Wire-harnesses for a particular subassembly may be oriented in a three-dimensional arrangement and protected in advance for ease of installation into the particular subassembly. Wire-harnesses for a particular subassembly can be placed into a container as an essentially planar form but comply with the three-dimensional assembly shape for ease of installation.

In order to form a particular three-dimensional structure, a plastic sheet is cut to the two-dimensional projected shape of a branch of the wire-harness. The plastic sheet will be wrapped around portions of the wire-harness to make it rigid in the longitudinal direction of the wires. The wire-harness is not wrapped in portions where it will be bent in the third dimension. Branches may be held in position to reduce the amount of labor during installation. The plastic sheet serves to maintain the wire-harness in a rigid shape that minimizes the number of attachment points so that pinches and abrasion are prevented.

Disclosed is the use of a thin plastic sheet to shape, retain, and protect a wire-harness in an automotive subassembly, particularly in a lamp subassembly. The two-dimensional shape is first obtained by projecting the shape of the wire-harness to a plane perpendicular to the average axis of loading the wire-harness in to the lamp subassembly. Additional width may be added to the projection to allow wrapping of the sheet around a majority of the length of the wire-harness. This stiff wrapped sheet provides rigidity, containment, and protection from abrasion and pinching.

The thin plastic sheet is preferably a thin opaque plastic that can be rolled, but when rolled is rigid in the longitudinal direction. In most automotive lamps, wires that are visible from the outside are seen as unattractive. An opaque sheet in a dark color becomes less visible. It is preferred that wires be black to conceal them in lamps. However, it is common in wire assemblies to have different color wires to aide in correct routing and inspection. An opaque sheet could allow the use of different colors without the risk of conspicuousness. The thin opaque sheet may be PET plastic. Thickness of a sheet may be in the range of 0.3 mm to 0.8 mm.

The thin plastic sheets may be extruded so the length can be very long, and the width is limited by the extrusion equipment. Wire harnesses by their nature are typically biased to be longer than wide. However, the harness is held, by the plastic sheet, to a 2 dimensional rigid shape in the assembly and a third dimensional of the shape is encouraged by the lack of rolling and creases in the flat areas, which may be used to bias the direction of the shape in the third dimension. The overall size of sheeting needed for an automobile vehicle may be as large as the vehicle assembly. A typical parking space is 10 feet by 20 feet, so a wire harness for all the interior lighting, power jacks, and data ports in a car may be at least the size of the parking space and may need to fit under the carpet and in walls or over the headliner and behind the pillar trim. The smallest practical lamp "foot print" is about 50 mm by 50 mm.

The plastic sheet may be of a color that will conceal the appearance of wires in the finished assembly. The thin plastic sheet should have enough thermal resistance to withstand the thermal environment of a specific lamp application. In some embodiments, the thin plastic sheet may be a polyethelene or a polycarbonate sheet to meet the needs of most automotive lamps. The thickness of the polycarbonate sheets may be in the same range as the PET plastic mentioned above.

For purposes of this disclosure, a wire harness is a bundle of wires in which each wire has 2 ends. Wires can end in terminals (metal pins or sockets) that are plugged into connector blocks or bulb sockets or occasionally lamp housings with the connector shape molded as a detail in the housing. Wires can end at a circuit board (attached permanently to that board with solder or a mechanical connection to the board). Wires can end in a splice (2 wires permanently joined and continuing as 1 wire). Connectors may come in several shapes, sizes, and types (for example, a card edge that connects directly to a circuit board, connectors that seal against the environment, unsealed connectors, locking connectors, primary and secondary locking connectors, connectors with or without terminal position assurance).

FIG. 1 is a view of a wire-harness before it is wrapped according to an exemplary aspect of the disclosure. The wire-harness 103 may be placed on a build board 101 for arrangement and assembly of plastic sheets. In some embodiments, the build board may include a template drawing for a particular automotive assembly to guide layout of the wire-harness 103. The template drawing may be on a drawing sheet, or may be sketched directly on a build board. In some embodiments, the automotive assembly is an automotive lamp. The wire-harness 103 may be projected to a shape that is a plane perpendicular to the average axis of loading the wire-harness in to the automotive lamp, where the plane is the surface of the build board 101. In some embodiments, the wire-harness 103 includes a main connector 105, which may establish a point of origin of the average axis and the average axis may project in a z-direction out of the build board 101. One or more branches of the wire-harness 103 may terminate at ends of a respective wire bundle, or may terminate at connectors 107. For ease of explanation, a wire-harness having three branches, each terminating with a connector will be described. However, it should be understood, that the number of branches and the type of terminal, as well as the final three-dimensional shape is limited only by the particular target automotive subassembly.

Wire-harnesses may be applied any time there are several long thin flexible conduits that must be organized in a subassembly. Examples include: electric: wires, data in the form of light; fiber optic cable, air for pneumatic controls, vacuum for vacuum control, fluid for hydraulic systems. Plastic injection molding machines have all of these systems to control or transmit energy for their systems. Subsequently, although the disclosed examples are for bundles of insulated wires, the disclosed solution may be applied as well to other types of bundled connections, including bundles of optical fiber strands.

Figure 2B:
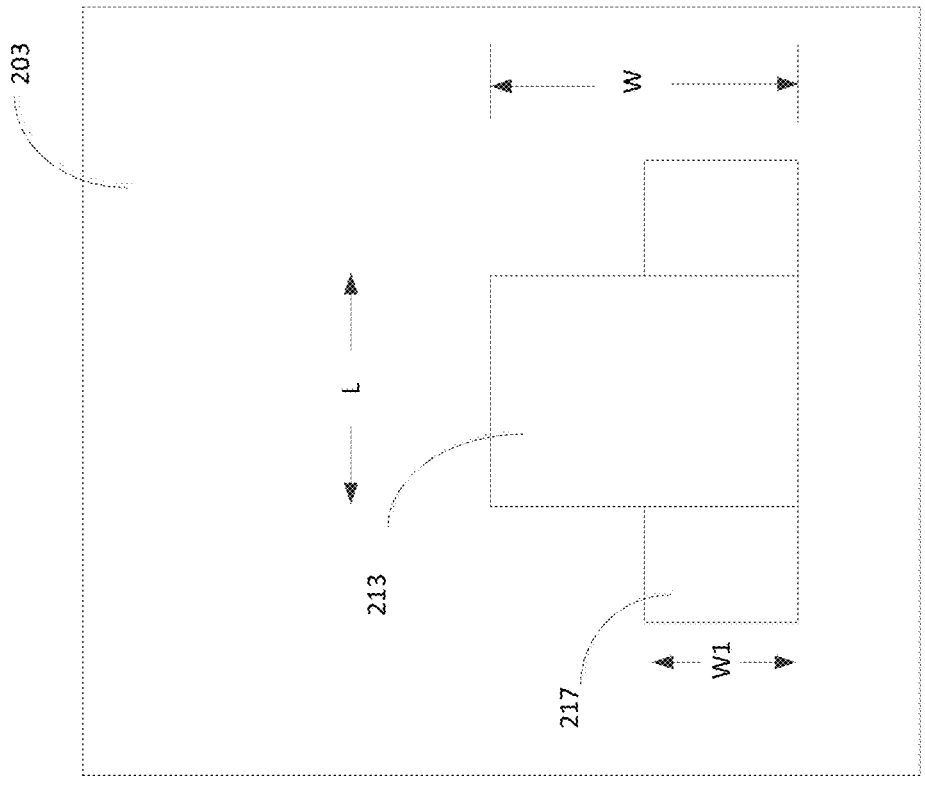
FIGS. 2A and 2B is a view of two dimensional sheets according to an exemplary aspect of the disclosure.
Figure 2A:
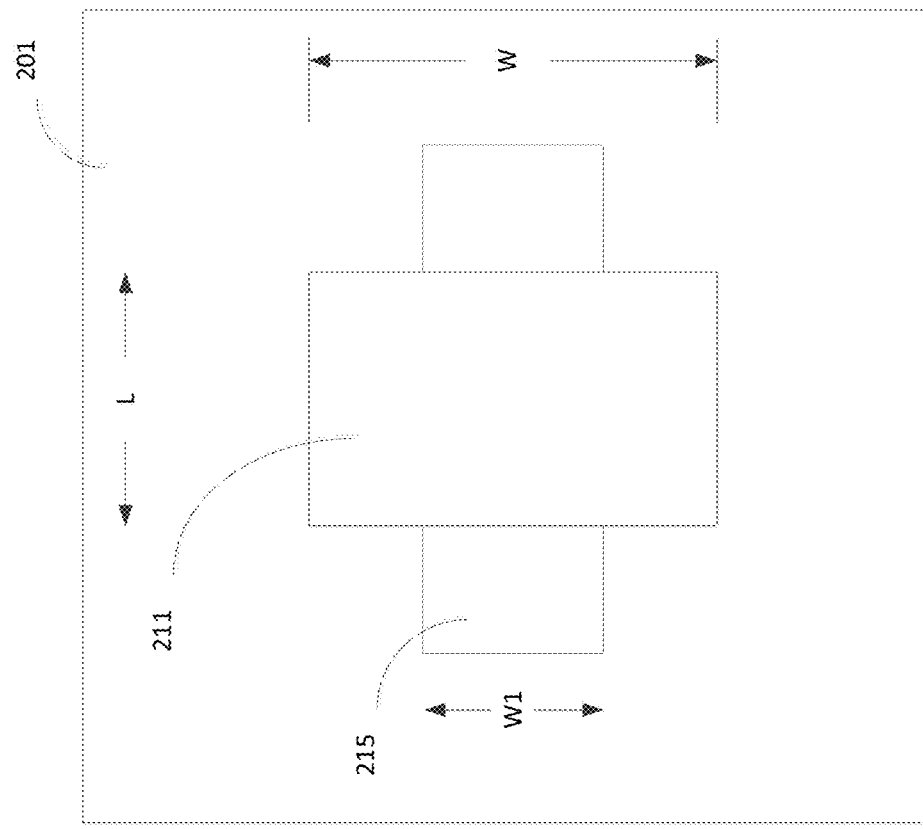

FIGS. 2A and 2B is a view of two-dimensional plastic sheets according to an exemplary aspect of the disclosure. For purposes of this disclosure, the shape of a die cut sheet is dictated by two constraints: the path the wire must take in the lamp to get to the connection points while staying removed from pinch points, abrasion risks, and electromagnetic interference (EMI) risks (i.e., routing wires in loops or having input and out put currents running parallel can create EMI. EMI is not an issue for light, air, vacuum, or fluid applications); and the need to minimize the wasted plastic sheet. Because the wires or more generally paths for a particular medium being transmitted will originate at a single source and radiate out to the various use points, the most efficient use of sheet material will be limited to paths with strait lines, right angles, and the occasional 45 degree angle. The third dimension of the shape of a die cut sheet does not fundamentally change the method of efficient use. It just complicates the planning and expands the space required in the 2 dimensional layout on the build board to have the lengths needed to distribute the paths in the third dimension. As mentioned earlier, the rolled portions are created to increase rigidity and constrain the wires to strait lines (i.e., strait lines for minimum distance), the flat portions are used to allow bends and guide wires into the third dimension according to the predetermined shape (i.e., that keeps the wires out of harm's way) These flat areas may be creased (e.g., like a piece of paper) to indicate, facilitate, promote the bend in the required direction. A crease could be perpendicular to the path of the wires on either side promoting a bend orthoganal to the plane defined by the first two dimensions or it could be at some angle to that plane other than 90 degrees to indicate a line with a different slope.

As noted above, the shape of the wire-harness may be projected to a plane perpendicular to the average axis of loading the wire-harness in to the lamp. This shape may be cut from a thin plastic sheet. Various cutting or trimming processes may be used to obtain the desired shape from a thin plastic sheet, including die cutting or routing. The sheet could also be thermally formed to create troughs rather than rolling it into tubes. However, use of thermal forming may be less efficient if it takes more energy and an additional process. Herein below, the shape is assumed to be die cut from a thin plastic sheet. Additional width may be added to the projection to allow wrapping the sheet around the majority of the wire-harness. In some embodiments, the area of plastic sheet is made to a minimum area required to shape and orient a wire-harness in order to optimize the amount of plastic sheet that is used. Also, it is preferred that the plastic sheet when cut for a specific application, will be continuous in the projection plane.

FIG. 2A is a view of a plastic sheet 201 in which a shape is die cut according to a pattern 211 having a length L and a width W. In some cases, a width W1 of some portions of the shape may be narrow to protect a portion of the wire-harness in which the wire-harness may be allowed to bend. FIG. 2B is a view of a plastic sheet 203 in which the shape is die cut according to a pattern 213 having a length L and a width W. The width W1 of one or more end portions 217 that is narrow may be positioned along an edge of the length of the shape 213.

FIG. 3 is a view of a tie strap according to an exemplary aspect of the disclosure. When the sheet is wrapped around the wire-harness, pairs of plastic straps, such as those used for plant identification tags, having an opening hole 303 in a tie strip 301, retains the sheet in the wrapped position. These tie straps 301 may be used at additional locations of the wire-harness, and may be used to retain the wire-harness in the subassembly. The tie straps 301 may be used to hold the wire-harness tight by locating a locking portion 305 at a distance C from the opening hole 303 that substantially corresponds to the circumference of the wire-harness.

Other types of materials and fastening devices may be used to hold the sheet in the wrapped position. A fastening device may be made of a metal, a fibrous material, or other materials having high tensile strength. Types of fastening devices may include a cable tie, a wiring clamp, a ferrule, or the like.

FIGS. 4A, 4B, 4C and 4D are views of a wire-harness as it is being wrapped according to an exemplary aspect of the disclosure. The sequence of assembly will be described next. Generally, a three dimensional shape is projected to a two dimensional sheet. The projected sheet's outline is precut, creases are put into flat areas to indicate and encourage bending in the correct direction. Then, the projected sheet is put on a build board and individual wires are organized on top of the board. Rigid portions could be formed as tubes by rolling one side over the wires, pushing an elongated tab under the wires and the sheet in that location, emerging on the other side, then the elongated tab can bend over again and be pushed through 2 slots in the sheet. As the tab emerges from the slots, the barbs will expand and the tab is prevented from returning back through the slots. In this example, the slot has its long dimension crossing the wires and a shorter dimension along the path of the wires. All the features to trap the wires in the sheet or vessel have this same basic concept: change from 2 dimensional to three dimensional to increase stiffness and contain the wires. Retain this shape by pushing a tab through a slot. Changing the orientation of a portion of the tab by a 90 degree rotation, in effect increases its width and prevents it from passing back out of the slot. Rigid sections may also be formed by creasing the sheet along the path of the wires at additional cost to give a flatter shape than the circle formed by rolling if space is limited. Additional tab and slots could be arranged along the path of the wires to form bends of a specific angle by forming a triangle. Two sides are the rigid portion containing the wires and the third side that is formed by a tab or tabs whose length determines the maximum angle after the tab has been engaged with a retaining slot. In this way a harness trapped on a sheet can remain a 2 dimensional shape for efficient shipment and be constrained into a 3 dimensional shape prior to installation in the assembly. Retention of the vessel and harness subassembly onto the assembly it is designed for may be achieved by: using barbed tabs in slots with the same concept as that used to keep the vessel in shape, push on retention strips that go over pins, the use of wire ties and other methods of retaining wire harnesses.

Regarding FIGS. 4A to 4D, a wire harness is provided to facilitate a description of principals of the disclosed solution. The disclosure is not limited to the example in FIGS. 4A to 4D. The disclosure applies to wire-harnesses having various numbers of bending portions and branches as are necessary for installation in a particular automotive subassembly. Portions of the wire-harness that need to be formed in the third dimension not contained in the original projection plane will not be wrapped at discrete portions of the length so that bending is allowed. In the areas that are not wrapped the sheet in the projection plane will limit motion or bending of the wire-harness in the projection plane. The amount of bending that may be predefined for a wire-harness structure may include 45 degree, 90 degree or 120 degree angles to accommodate automotive subassembly arrangements.

Figure 4A:
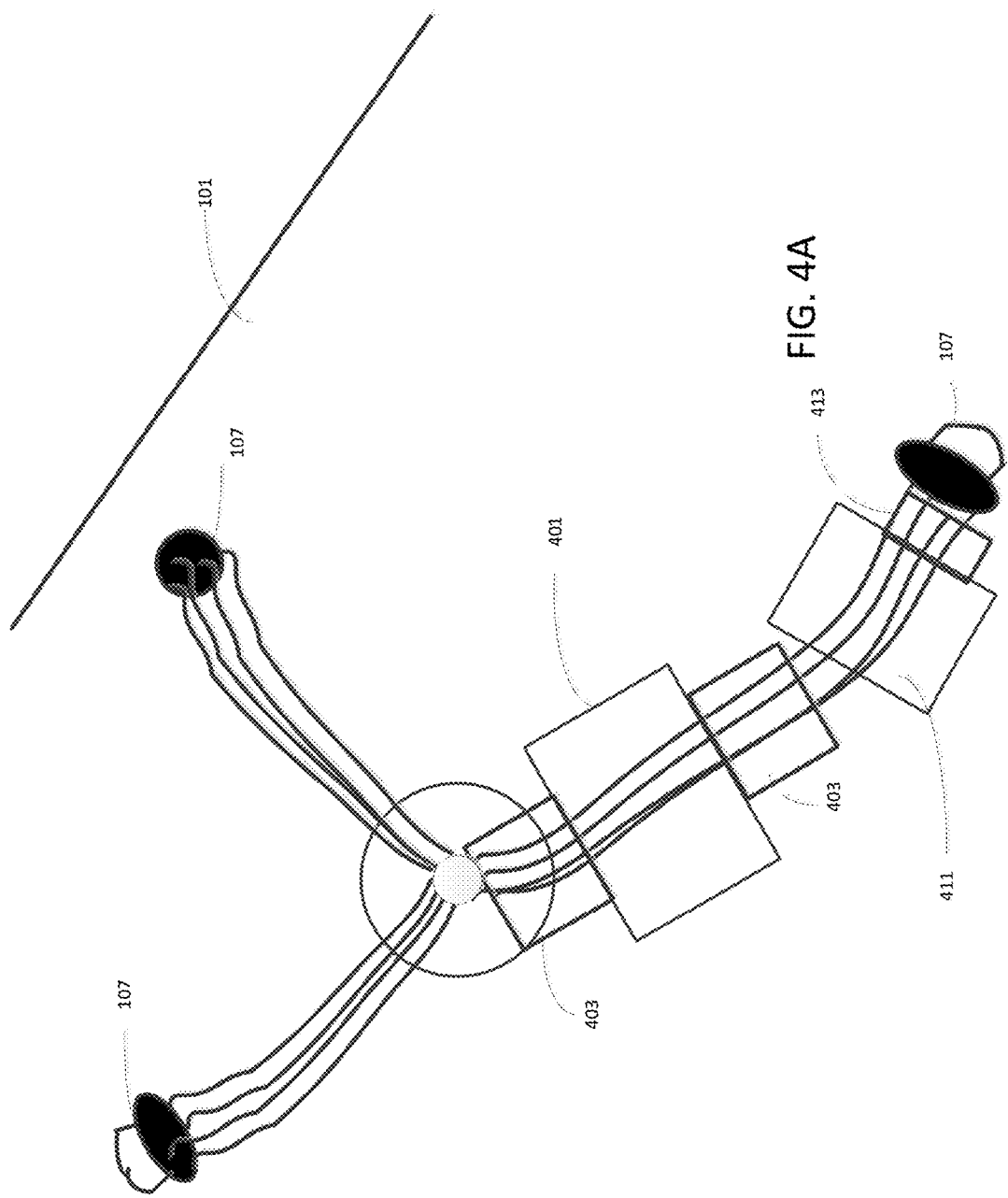

FIG. 4A is a view of plastic sheet cut to shapes for a first branch of the wire-harness. One plastic sheet has narrow portions 403 and a length portion 401. One narrow portion 403 allows bending of the wire-harness in a portion between 403 and sheet 411. A second plastic sheet has a narrow portion 413 and a length portion 411. Narrow portions at ends of the branch allow wrapping of the sheet where there are connections. In some cases, a pre-cut plastic sheet is placed below the wire-harness with the wire-harness at the center of the sheet. The wire-harness is then wrapped by bringing together each side of the plastic sheet and overlapping one of the sides over the other. A pair of tie straps 405 are then applied to the vicinity of each end of the length portion 401 to hold the wrapped plastic sheet in place. A pair of tie straps 415 are then applied to the vicinity of each end of the length portion 411 to hold the wrapped plastic sheet in place. Narrow portions 403, 413 may be partially wrapped without being bound by a tie strap.

Figure 4B:
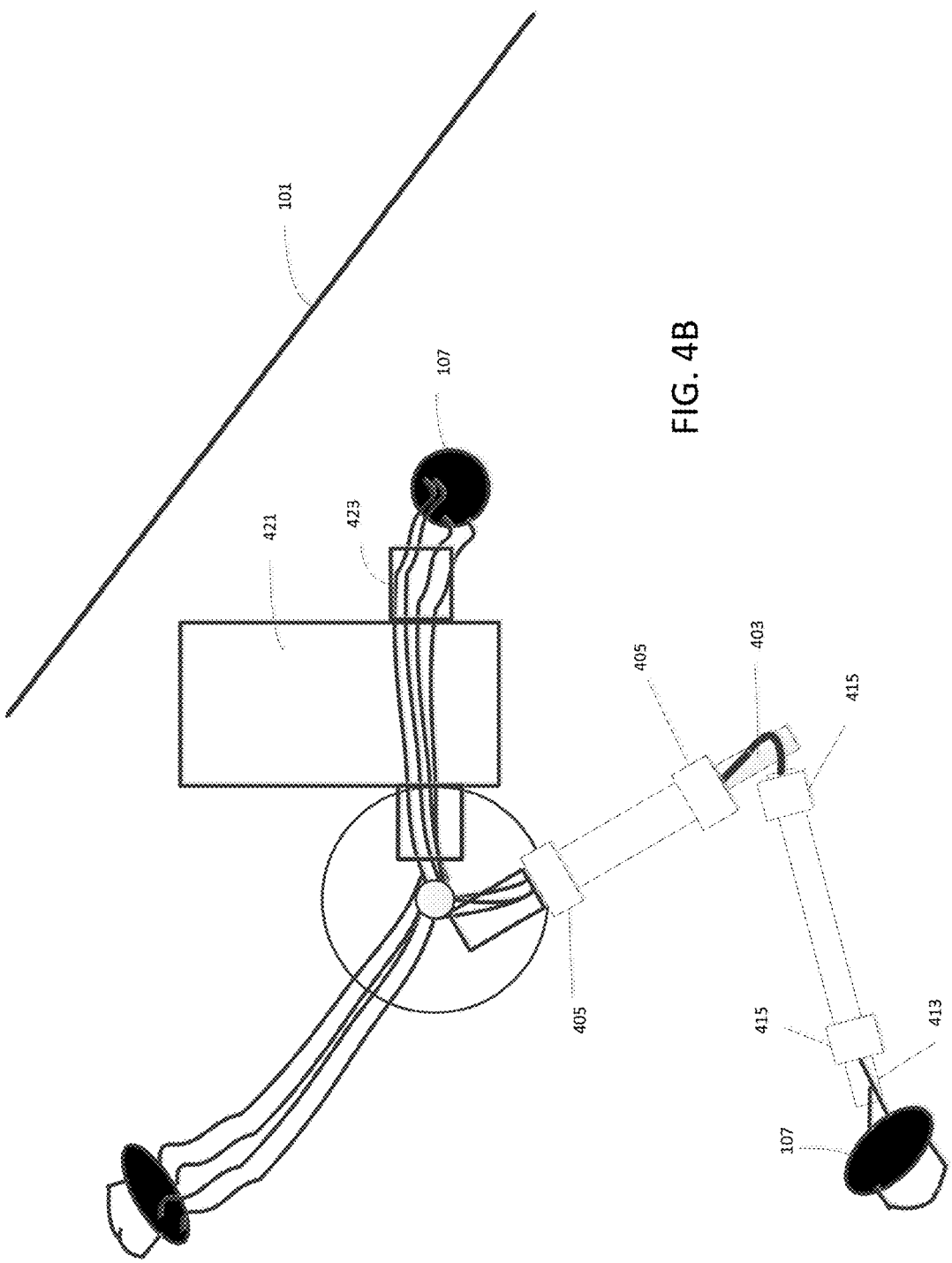

FIG. 4B is a view of a plastic sheet cut to a shape for a second branch of the wire-harness. Narrow portions 423 allow the sheet to be wrapped near end connections. The lengthwise portion 421 may be wrapped around substantially an entire length of the wire-harness. In some embodiments, the pre-cut plastic sheet may be placed below the associated portion of the wire-harness such that the portion of the wire-harness is in the vicinity of one end of the plastic sheet. The opposite end of the plastic sheet may be wrapped to meet the one end and secured with a pair of tie straps 425 near edges of the length portion 421.

FIG. 4C is a view of a plastic sheet cut to a shape for a third branch of the wire-harness. A narrow portion 433 allows the sheet to be wrapped near an end connection. The lengthwise portion 431 may be wrapped around a majority of the length of the third branch of the wire-harness. Similar to the case in FIG. 4C, the pre-cut plastic sheet may be placed below the associated portion of the wire-harness such that the wire-harness is offset from the center of the plastic sheet, toward one end of the sheet. The opposite end of the plastic sheet may be wrapped around the wire-harness to meet the one end, and secured with a pair of tie straps 435.

Figure 4D:
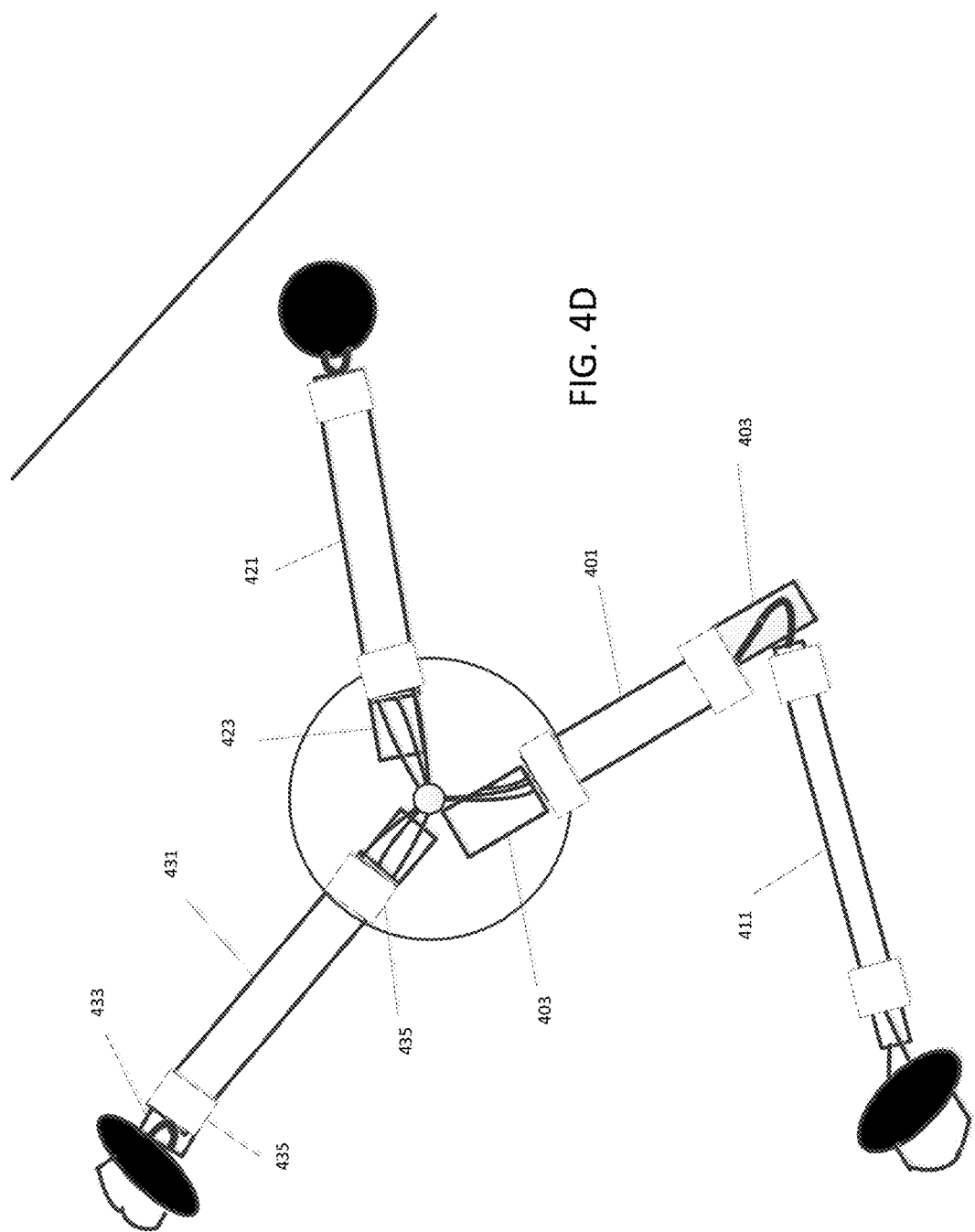

FIG. 4D is a view of a completed wire-harness that has been wrapped with plastic sheets that form a three-dimensional structure.

Figure 5:
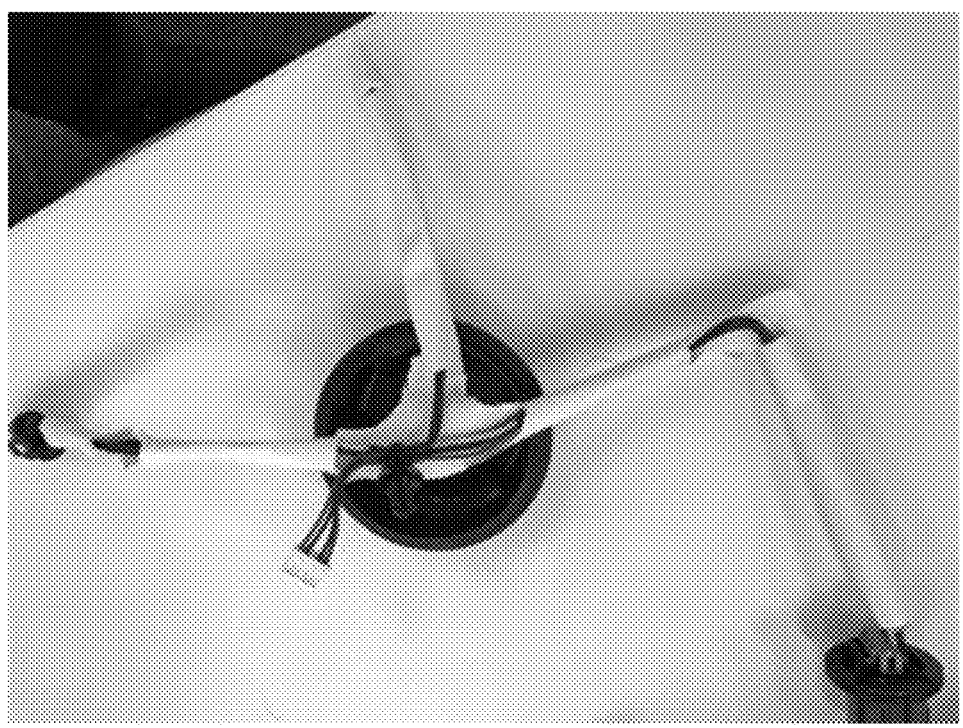
FIG. 5 is a perspective view of a three-dimensional shaped wire-harness according to an exemplary aspect of the disclosure.

FIG. 5 is a perspective view of a three-dimensional shaped wire-harness according to an exemplary aspect of the disclosure. In this way an original two-dimensional sheet of plastic can define one three-dimensional shape for the wire-harness. This reduces the labor time to install the wire-harness into the assembly. Once an easily identifiable feature, like the main connector, is installed in the correct location, the wire-harness falls into the desired final position against the walls of the lamp housing, properly oriented for additional connections. The sheet in the original projection plane that has not been wrapped is now in between the lamp volume and the wires and thus prevents abrasion and pinching.

Creasing of the plastic sheet maybe applied to areas required to form the third-dimensional axis to ease bending or to direct the wire-harness to bend in a direction other than that axis by creasing at angles different than 90 degrees to the length of the wire branch.

Figure 6:
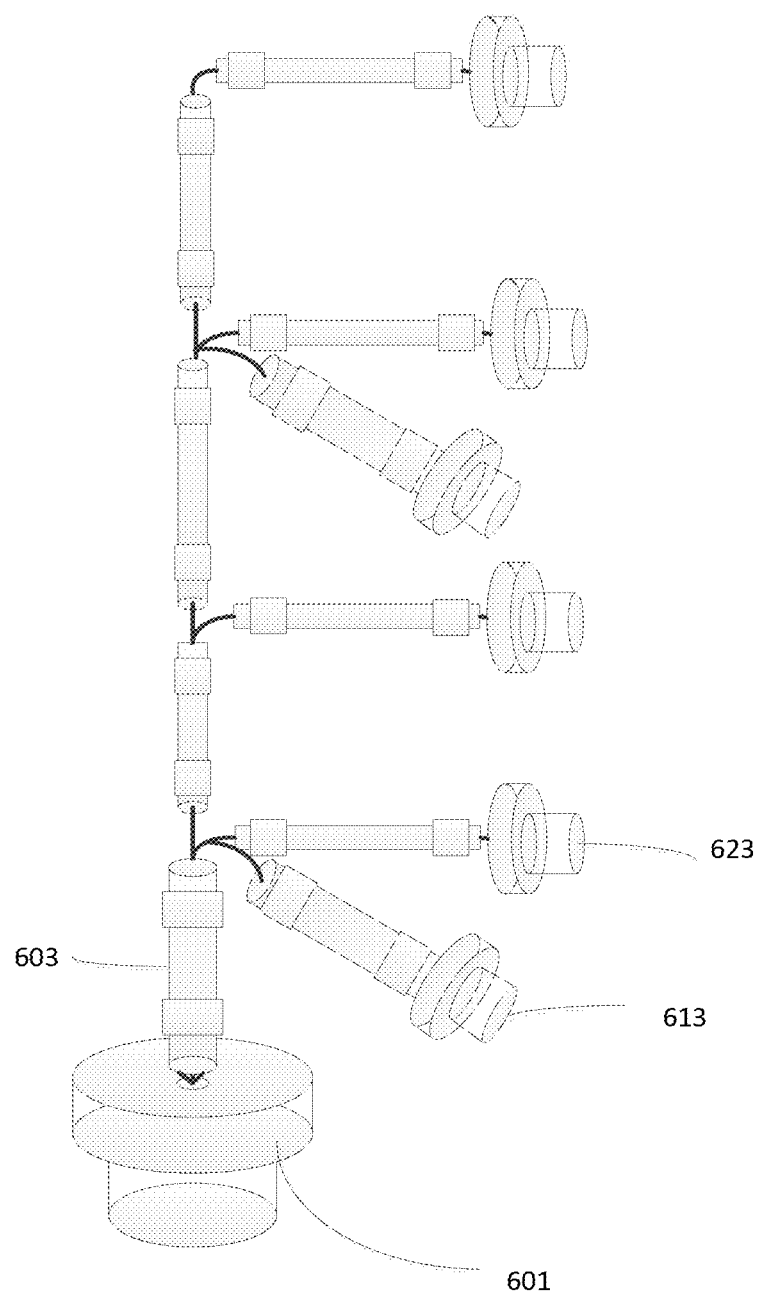
FIG. 6 illustrates another three-dimensional wire-harness according to an exemplary aspect of the disclosure.
Figure 7A:
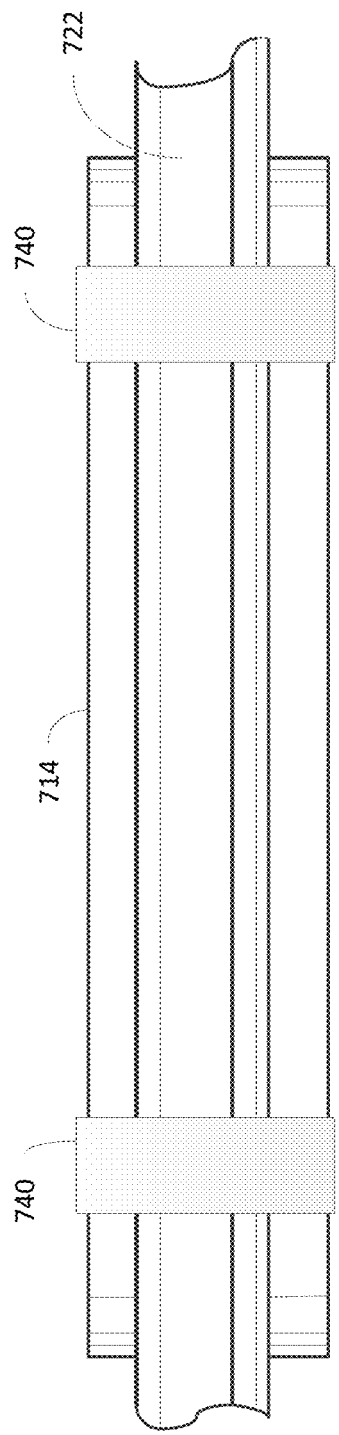
FIGS. 7A and 7B are schematic diagrams of conventional wire-harnesses.
Figure 7B:
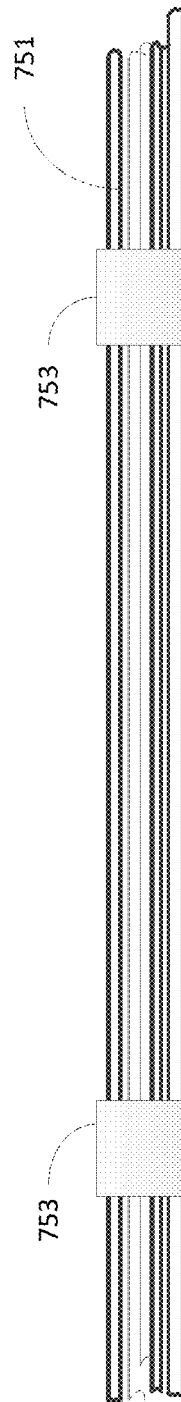

FIG. 6 illustrates another three-dimensional wire-harness according to an exemplary aspect of the disclosure. This three-dimensional structure illustrates that the wire-harness can be extended to various other structural arrangements. In the example of FIG. 6, several branches of a wire-harness may be formed starting from a main connector 601, where each branch may have one or more further branches to end connectors 613, 623 which are provided at terminals that project from a main axis 603. Features of a three-dimensional structure are based on the target automotive subassembly that the structure is to be installed. In particular, the number and location of bending portions and the number and location of branches is determined by the target automotive subassembly. By assembling the three-dimensional structure of a wire-harness in advance, the work involved in installing the wire-harness is greatly simplified. Also, the thin plastic sheets that are wrapped around portions of the wire-harness provide stiffness for holding the three-dimensional structure of the wire-harness, and serve to isolate the wires from the automotive subassembly, and thus prevent pinching and abrasion.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A wire-harness device for an automobile vehicle, comprising:
    at least one plastic sheet wrapped around a plurality of insulated wires between discrete positions forming at least one branch to allow bending at the discrete positions and maintain stiffness between the discrete positions;
    a three-dimensional arrangement of the wrapped wires formed by bending at the discrete portions, the three-dimensional arrangement forming a predefined shape for positioning against sides of a panel in an orientation for connection at predetermined locations of the panel;
    a pair of straps wrapped around each end of the at least one plastic sheet for holding the plastic sheet in place; and
    at least two of the plastic sheets forming two or more branches and at least one discrete bending position is between the branches.

2. The wire-harness device of claim 1, wherein the pair of straps are plastic retaining tags each having locking portion at a position corresponding to a circumference of the wire-harness.

3. The wire-harness device of claim 1, further comprising an axis where the wire-harness is loaded into a lamp at one end of the plurality of insulated wires.

4. The wire-harness device of claim 1, wherein the at least one plastic sheet has a thermal resistant material sufficient to withstand deformation due to heat.

5. The wire-harness device of claim 1, wherein the at least one plastic sheet is wrapped around the plurality of insulated wires between pairs of the discrete positions.

6. The wire-harness device of claim 1, wherein the at least one plastic sheet is made of polyethelene and is of a thickness sufficient to maintain the stiffness along a length direction of the insulated wires to form the predefined shape when wrapped around the insulated wires.

7. The wire-harness of claim 1, wherein at least one end of the at least one branch has a connector.

8. An optical fiber bundle device for an automotive lamp, comprising:
   a plurality of optical fiber strands;
   at least one plastic sheet wrapped around the plurality of optical fiber strands between discrete portions forming at least one branch;
   a three-dimensional arrangement of the wrapped strands formed by bending at one or more of the discrete position, the three-dimensional arrangement forming a predefined shape for positioning within sides of a housing of the lamp;
   a pair of straps wrapped around the at least one plastic sheet adjacent to each end for holding the plastic sheet in place; and
   at least two of the plastic sheets forming two or more branches and at least one discrete bending position is between the branches.

9. The optical fiber bundle device of claim 8, wherein the pair of straps are plastic retaining tags each having a locking portion at a position corresponding to a circumference of the plurality of optical fiber strands.

10. The optical fiber bundle device of claim 8, further comprising an axis where the optical fiber bundle is loaded into a lamp at one end of the optical fiber strands.

11. The optical fiber bundle device of claim 8, wherein the at least one plastic sheet is wrapped around the plurality of optical fiber strands between pairs of the discrete positions.

12. The optical fiber bundle device of claim 8, wherein the at least one plastic sheet is made of polyethelene and is of a thickness sufficient to maintain the stiffness along a length direction of the optical fiber strands to form the predefined shape when wrapped around the optical fiber strands.

13. The optical fiber bundle device of claim 8, wherein at least one end of the at least one branch has a connector.

14. A method of assembling a wire-harness for an automotive subassembly, the method comprising:
   projecting a shape of the wire-harness to a plane perpendicular to an axis of an end of the wire harness configured to connect for connection into the automotive subassembly;
   cutting a plastic sheet into a first sheet having a first predetermined shape for a continuous portion of the wire-harness extending from the end to a discrete position;
   placing the cut first sheet on a build board;
   wrapping the cut first sheet around the continuous portion of the wire-harness;
   retaining the first sheet wrapped around the wire-harness using a pair of straps;
   die cutting a plastic sheet into a second sheet having a second predetermined shape for a branch of the wire-harness extending from the discrete position to another discrete position;
   wrapping the second cut sheet around the branch of the wire-harness;
   retaining the second cut sheet around the branch of the wire-harness using another pair of straps; and
   continue cutting, wrapping and retaining additional sheets for branches of the wire-harness between predetermined discrete positions until other end portions of the wire-harness are reached.

15. The method of assembling the wire-harness of claim 14, wherein the cutting includes die cutting a plastic sheet.

16. The method of assembling the wire-harness of claim 14, further comprising:
   bending the branches of the wire-harness at predetermined unwrapped discrete positions by respective predetermined angles.

17. The method of assembling the wire-harness of claim 16, wherein the predetermined angles include 45 degree and 90 degree angles.

18. The method of assembling the wire-harness of claim 16, wherein the end includes a connector, the method further comprising:
   installing the connector in a predetermined location of the automotive subassembly;
   placing the wire-harness against sides of the automotive subassembly at three-dimensional orientations in which ends of branches are associated with predetermined connections in the automotive subassembly; and
   attaching ends of the branches to the associated predetermined connections.

* * * * *